US006630765B2

(12) United States Patent
Silva et al.

(10) Patent No.: US 6,630,765 B2
(45) Date of Patent: Oct. 7, 2003

(54) COIL LEAD AND TERMINAL SECUREMENT CAPS FOR SECURING WIRES OF A ROTOR

(75) Inventors: Jorge Esteban Silva, Anderson, IN (US); Randy G. Parker, Daleville, IN (US); Vern H. George, Pendleton, IN (US)

(73) Assignee: Delphi Technologies, Inc., Troy, MI (US)

(*) Notice: Subject to any disclaimer, the term of this patent is extended or adjusted under 35 U.S.C. 154(b) by 8 days.

(21) Appl. No.: 09/773,274

(22) Filed: Jan. 31, 2001

(65) Prior Publication Data

US 2002/0101127 A1 Aug. 1, 2002

(51) Int. Cl.[7] ........................ H01R 39/36; H01R 39/38; H02K 13/00; H02K 1/22

(52) U.S. Cl. ........................ 310/249; 310/261; 310/262; 310/263; 310/238; 310/219

(58) Field of Search ................................ 310/261–263, 310/249, 238, 219, 127–128, 71, 68 R, 66, 40 R, 10

(56) References Cited

U.S. PATENT DOCUMENTS

| | | | | | |
|---|---|---|---|---|---|
| 3,076,110 | A | * | 1/1963 | Larson et al. | 310/194 |
| 3,184,625 | A | * | 5/1965 | Farison | 310/59 |
| 3,252,025 | A | * | 5/1966 | Brown et al. | 310/168 |
| 3,271,604 | A | * | 9/1966 | Priddy | 310/234 |
| 3,305,740 | A | * | 2/1967 | Shano | 310/42 |
| 4,043,621 | A | * | 8/1977 | Heinz | 308/189 R |
| 4,228,377 | A | * | 10/1980 | Kreuzer | 310/263 |
| 4,271,336 | A | * | 6/1981 | Shitrai | 200/24 |
| 4,419,597 | A | * | 12/1983 | Shiga et al. | 310/68 D |
| 4,576,085 | A | * | 3/1986 | LeBlanc | 89/36.13 |
| 4,686,399 | A | * | 8/1987 | Imori et al. | 310/62 |
| 4,837,920 | A | * | 6/1989 | Sweet et al. | 29/597 |
| 4,926,076 | A | * | 5/1990 | Nimura et al. | 310/68 D |
| 5,254,896 | A | * | 10/1993 | Bradfield et al. | 310/263 |
| 5,479,060 | A | * | 12/1995 | Giamati et al. | 310/232 |
| 5,509,625 | A | * | 4/1996 | Oullette et al. | 244/134 D |
| 5,572,178 | A | * | 11/1996 | Becker et al. | 336/120 |
| 5,625,244 | A | * | 4/1997 | Bradfield | 310/232 |
| 5,627,422 | A | * | 5/1997 | Boggs et al. | 310/105 |
| 5,650,679 | A | * | 7/1997 | Boggs et al. | 310/105 |
| 5,651,687 | A | * | 7/1997 | Du-Rocher et al. | 439/164 |
| 5,767,605 | A | * | 6/1998 | Giamati | 310/239 |
| 5,886,451 | A | | 3/1999 | Hatsios et al. | 310/263 |
| 6,369,471 | B1 | * | 4/2002 | Whitted et al. | 310/62 |

* cited by examiner

*Primary Examiner*—Tran Nguyen
*Assistant Examiner*—Pedro J. Cuevas
(74) *Attorney, Agent, or Firm*—Margret A. Dobrowitsky

(57) ABSTRACT

An electric machine having a rotor carrying a field coil has a fan and slip ring assembly. The slip ring assembly is axially remote from the fan portion, the slip ring assembly being electrically connected to the field coil. The point of connection between the slip ring assembly and the field coil is secured to the fan by a thermoplastic retaining member that is ultrasonically welded to the surface of the fan.

17 Claims, 5 Drawing Sheets

COIL LEAD AND TERMINAL SECUREMENT CAPS FOR SECURING WIRES OF A ROTOR

CROSS REFERENCE TO RELATED APPLICATIONS

This application is related to U.S. Pat. Nos. 5,625,244 and 5,886,451, the contents of which are incorporated herein by reference thereto.

TECHNICAL FIELD

The present invention relates generally to rotors for electrical machines, and more specifically to a method and apparatus for securing the wires for the field-generating coils of such rotors.

BACKGROUND

In many electrical machines, a rotor includes an electromagnetic field-generating coil which rotates with the rotor. In such machines, slip rings are typically provided as a part of the rotor assembly. The slip rings and their associated brushes provide a means for connecting the field generating coil to a source of electrical current.

Connection of the field-generating coil to the slip rings can present reliability improvement opportunities in the design of a rotor for an electrical machine.

Therefore, wire routing designs for electrical machine rotors which can provide improved reliability and reduced cost are desirable.

SUMMARY

The present invention provides a method and apparatus for securing the connection between the slip ring and the coil of a rotor for an electrical machine.

Therefore, and in accordance with an exemplary embodiment of the present invention, a fan and a pair of slip rings are integrated into a unitary assembly, which cooperatively with the rotor shaft of the machine, provides for simple routing and single point termination for rotor coil leads. The slip ring assembly includes a pair of slip rings and corresponding terminal extending axially therefrom. A respective one of the coil leads is coupled to each slip ring terminal. The resulting connections are secured to the surface of the fan with a retaining member. The retaining member covers the joint and is ultrasonically welded to the surface of the fan.

The above-described and other features and advantages of the present invention will be appreciated and understood by those skilled in the art from the following detailed description, drawings, and appended claims.

DETAILED DESCRIPTION

Figure 1:
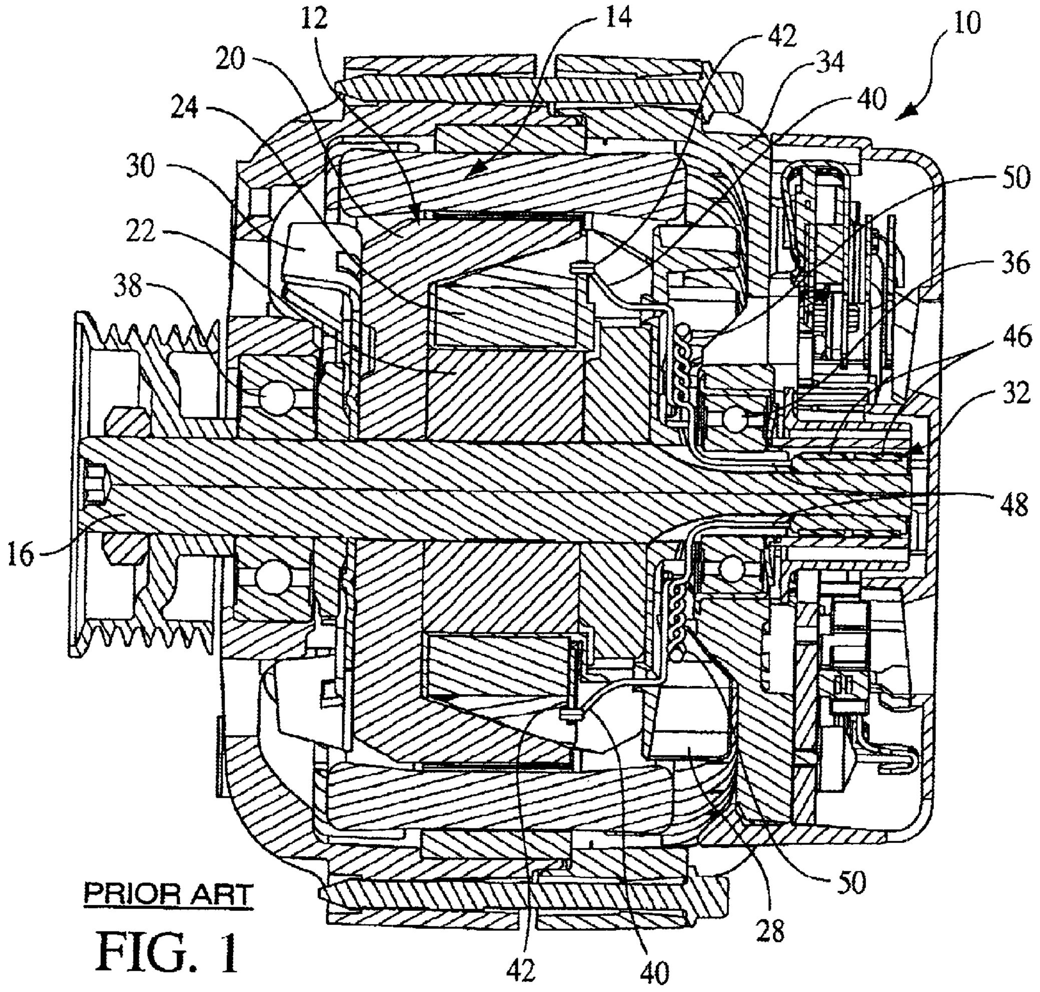
PRIOR ART FIG. 1
FIG. 1 is a cross-sectional view of an alternator.
Figure 2:
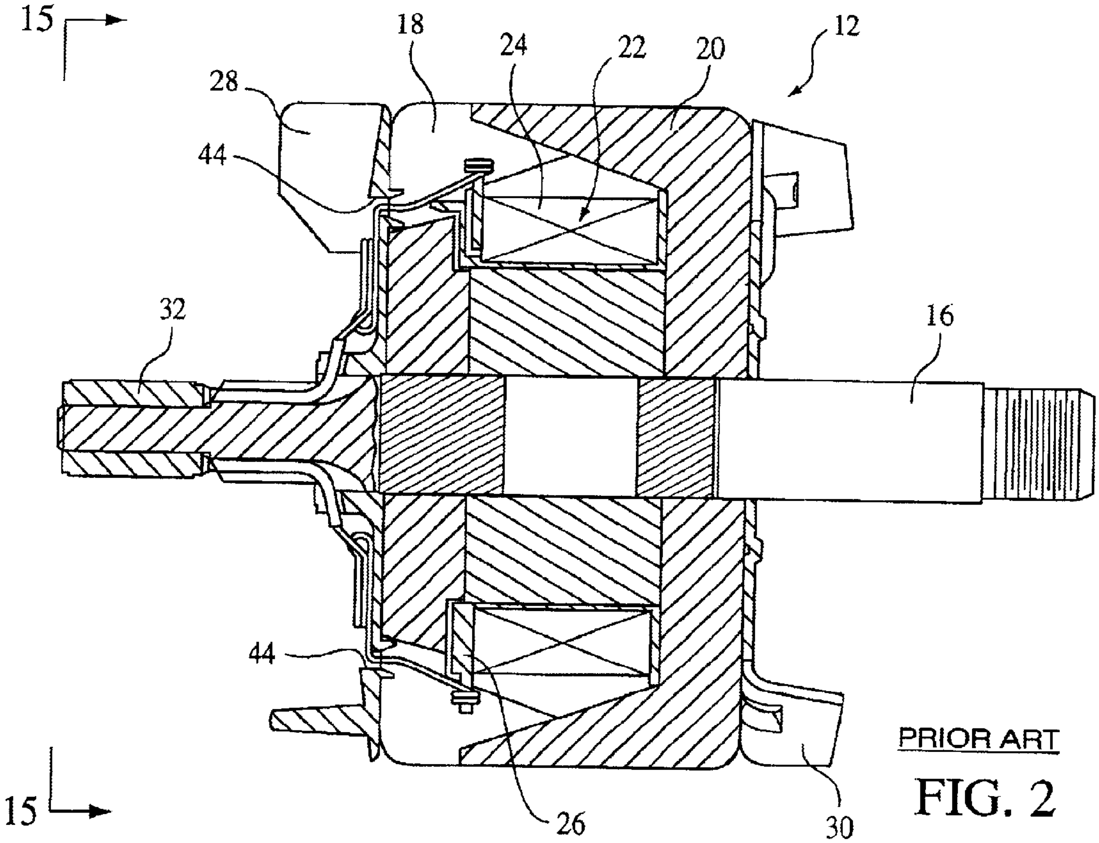
FIG. 2 is a cross-sectional view of the rotor assembly.
Figure 5:
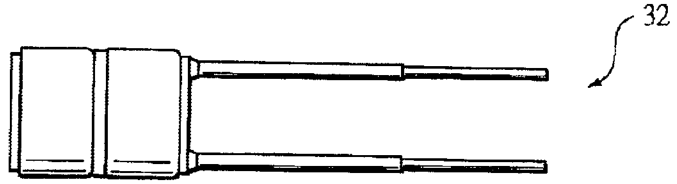
FIGS. 5–8 illustrate an alternator slip ring assembly.
Figure 7:
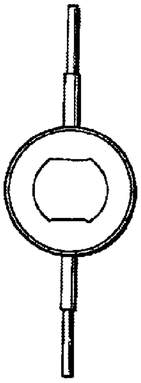
Figure 6:
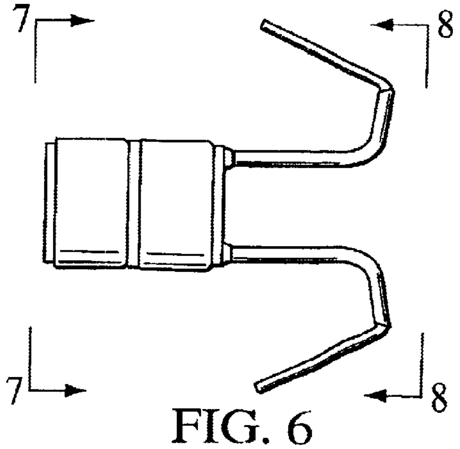
Figure 8:
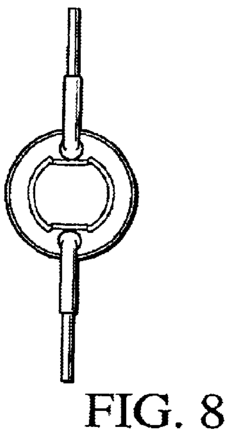
Figure 9:
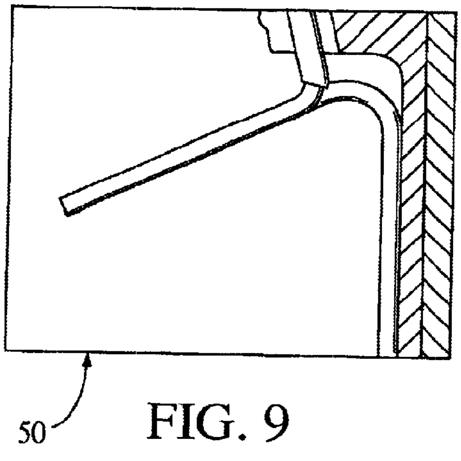
FIGS. 9–11 illustrate the connection of a slip ring assembly and a coil.
Figure 10:
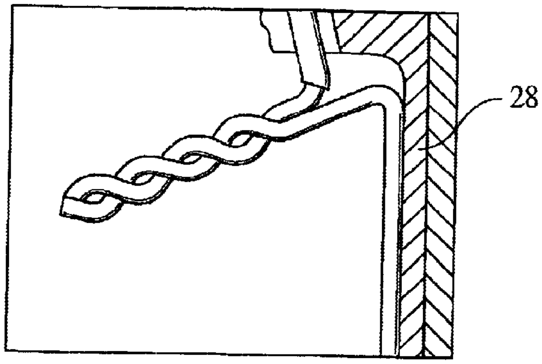

An alternator 10 is shown in cross-section in FIG. 1. Alternator 10 has a rotor assembly 12 (FIG. 2) and a stator assembly 14. Rotor assembly 12 includes a shaft 16 supporting rotating magnetic circuit structures thereof including, pole members 18 and 20, a rotor core 22, and a field coil 24 wound upon a bobbin 26. In addition, all other non-magnetic circuit rotating structures are also carried by shaft 16, including air circulation fans 28 and 30 located at axially opposite sides of pole members 18 and 20, and a slip ring assembly 32 located at one end of shaft 16.

Fan 30 is formed from sheet metal stock and is secured to pole member 20 by a securement means such as spot welding. Fan 28 is formed from an appropriate thermoplastic material and is heat-staked to power extensions (not shown) from the field coil bobbin 26. Shaft 16 is rotatably supported within a housing 34 by a pair of bearings 36 and 38. Bearing 36 is located between slip ring assembly 32 and fan 28.

Figure 17:
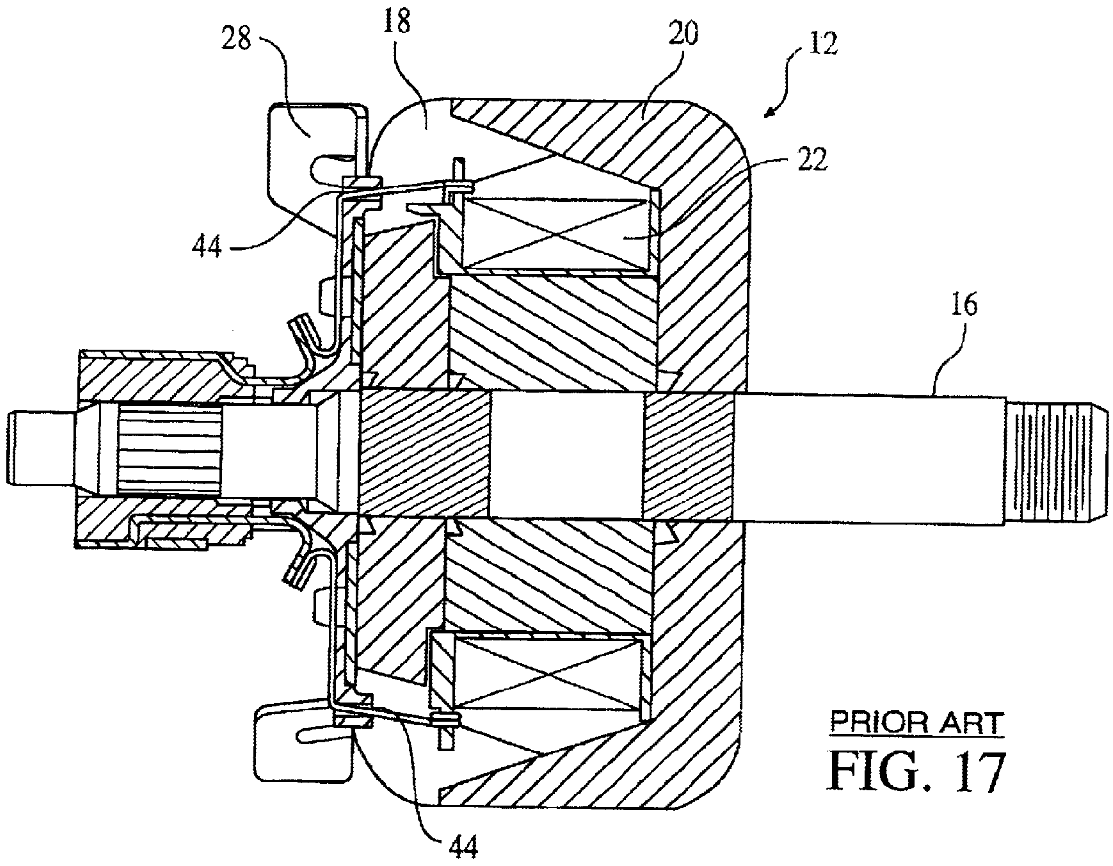
PRIOR ART FIG. 17
FIG. 17 is a cross-sectional view of an alternative rotor assembly.

Coil leads 40 of field coil 24 are wrapped about respective posts 42 of bobbin 26. Coil leads 40 pass through openings 44 in fan 28. (See also FIG. 17).

Slip ring assembly 32 has a pair of copper rings 46, each having a slip ring lead 48 joined by welding or brazing thereto.

The copper rings and wires are molded into a thermoset or thermoplastic material to complete the slip ring assembly. Slip ring assembly 32 is pressed onto the end of rotor shaft 16, and the slip ring leads 48 are routed into channels positioned along shaft 16 where they are joined to coil leads 40 of field coil 24 by twisting and welding to form a joint 50.

Joint 50 is then bent to the surface of fan 28 and is secured thereto by heat staking. Bearing 36 is assembled to pass over slip ring assembly 32 and retain the lead wires 48 securely within the shaft channels.

Figure 3:
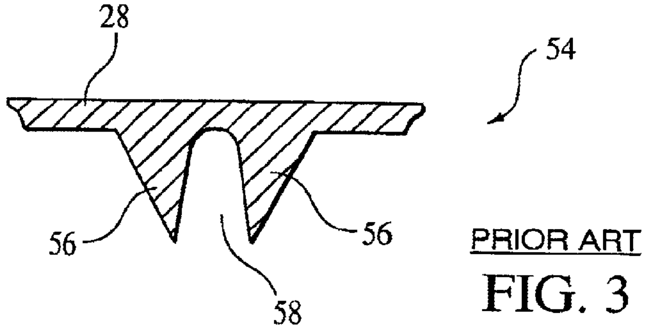
PRIOR ART FIG. 3
FIGS. 3 and 4 are cross-section views of ultrasonic welding points on the fan of an alternator.
Figure 4:
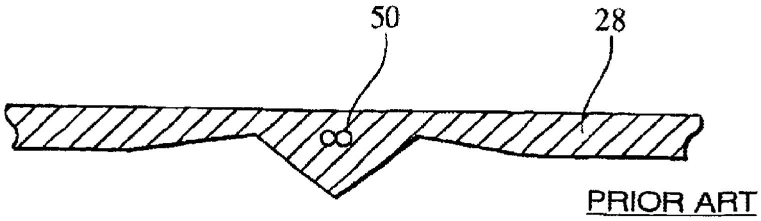
PRIOR ART FIG. 4

Referring now to FIGS. 3 and 4, a securement member 54 is illustrated. Securement member 54 provides a means for securing joint 50 to fan 28. Securement member 54 is positioned to receive and secure joint 50 to fan 28. Typically, fan 28 is molded with a pair of securement members 54. Each securement member has a pair of tab portions 56 that depend outwardly from the surface of fan 28 and which defines a receiving area 58.

Accordingly, and after joint 50 is formed and bent towards the surface of fan 28, and in particular into receiving area 58 of securement member 54, tabs 56 are heat-staked to secure joint 50 to fan 28 (FIG. 4).

This type of securement is permanent and provides the necessary durability to joint 50. Moreover, such a means of securement is completely destroyed if, for example, slip ring assembly 32 is removed from shaft 16.

This is particularly true in applications where alternator 10 is being rebuilt and the surface of a slip ring assembly 32 has become worn or damaged. This may be caused by the brushes of the alternator continuously making contact with the surface of slip ring assembly 32. Accordingly, and in order to rebuild alternator 10, it may be necessary to remove and replace the slip ring assembly. Once the slip ring assembly has been removed and joint 50 has been pulled from its staked position in fan 28 (FIG. 4), it is no longer possible to heat-stake joint 50 to fan 28, as there simply is not enough excess material to heat-stake the joint to the surface of fan 28.

Referring now to FIGS. 5–16, and in accordance with an exemplary embodiment of the present invention, the securement of a new joint 50 to fan 28 is illustrated. A new slip ring assembly 32 is prepared for insertion onto shaft 16 (FIGS. 5–8).

Slip ring assembly leads 48 are lined up with coil leads 40 (FIG. 9), then twisted together (FIG. 10) and welded to form a new joint 50.

Figure 11:
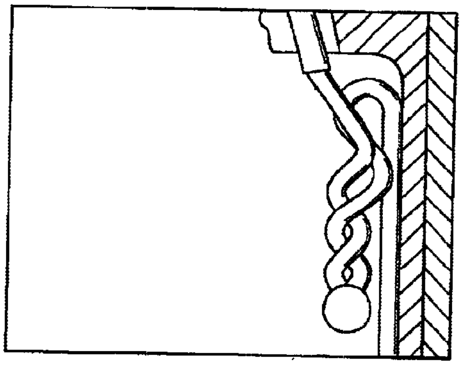
Figure 12:
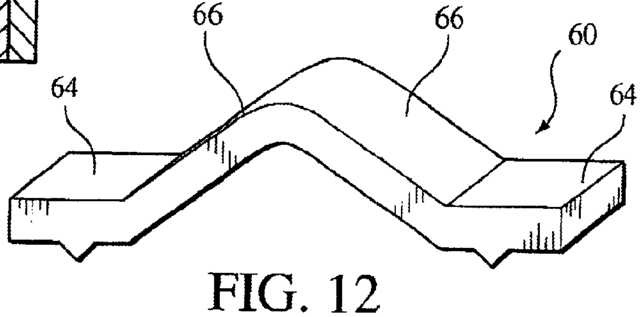
FIGS. 12–14 illustrate a cap constructed in accordance with an exemplary embodiment of the present invention.
Figure 13:
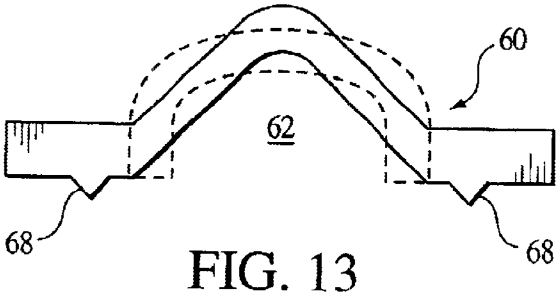
Figure 14:
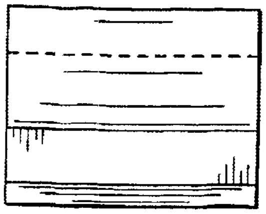
Figure 15:
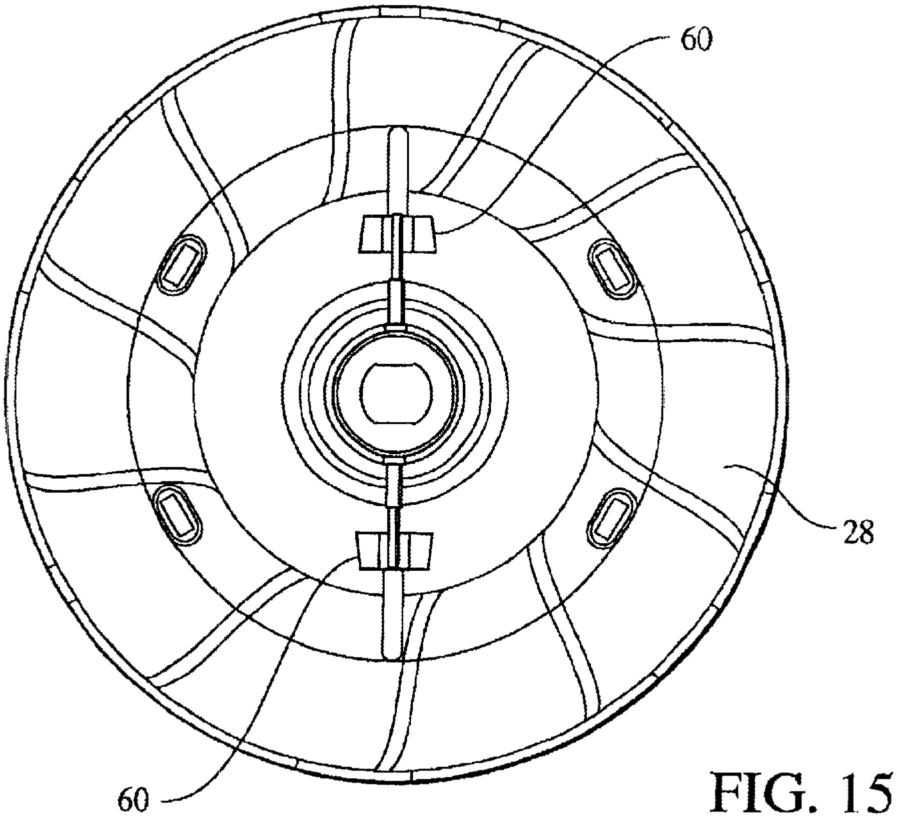
FIG. 15 is a view along the lines 15—15 of FIG. 2.
Figure 16:
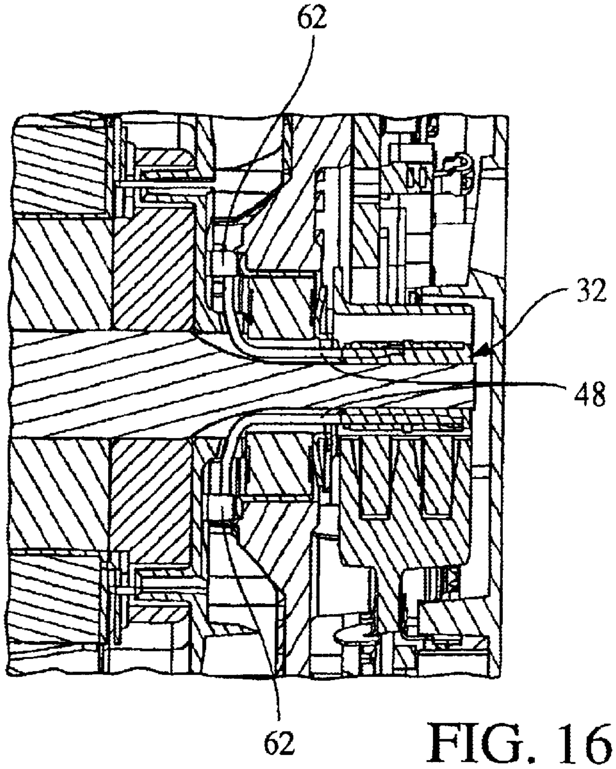
FIG. 16 is an enlarged view of FIG. 1.

Once the leads are twisted and welded together, the same are bent towards the surface of fan 28 (FIG. 11). A retaining member 60 (FIGS. 12–14) is now secured to fan 28 over joint 50. Retaining member 60 replaces support member 54. Retaining member 60 is manufactured out of a nylon material capable of being heat-staked to fan 28.

In an exemplary embodiment, retaining member 60 defines an inner receiving area 62. Receiving area 62 is sufficiently large enough to accommodate joint 50 while allowing retaining member 60 to be secured to fan 28.

Retaining member 60 has a pair of end portions 64 which are connected to each other by a pair of leg members 66. Leg members 66 are secured to each other at one end, and to end portions 64 at the other. Leg portions 66 are configured to traverse upwardly and away from end portions 64 at a 45° angle until each leg portion 66 meets with the other. Accordingly, the intersection of the upper surfaces of leg members 66 define a 90° angle with respect to each other. Of course, the angular configuration of leg portions 66 with respect to each other may vary to include angles greater than or less than 90°.

In addition, the lower surface of end portions 64 is configured to have heat staking portions 68. Heat staking portions 68 provide the necessary material for staking retaining member 60 to the surface of fan 28. Heat staking portions 68 traverse the width of end portions 64. In an exemplary embodiment, heat staking portions 68 protrude 0.5 mm from the surface of end portions 64. Of course, the size configuration and number of heat staking portions 68 may vary.

In an exemplary embodiment, retaining member 60 has the following dimensions: 13 mm in length, 6 mm in width, and 4.8 mm in overall height. Each staking portion 68 protrudes 0.5 mm from the bottom surface of end portions 64. End portions 64 have the following dimensions: 3.5 mm×1.25 mm×6.0 mm.

Of course, the size, configuration, and dimensions of retaining member 60 may vary. For example, an alternative retaining member 60 is configured to have a more rectangular configuration, illustrated by the dashed lines in FIG. 13. Of course, may other configurations, such as trapezoidal, parrellpiped etc. of retaining member 60 are contemplated in accordance with the present invention.

Accordingly, and through the use of retaining member 60, the removal of the slip ring assembly and replacement thereof with a new slip ring assembly, having unworn slip ring surfaces, is facilitated in a manner which allows for a secure attachment of the same. The point of attachment for the leads of the slip ring assembly and the leads of the coil is fixedly secured to the surface of fan 28. This allows alternator 10 to be rebuilt without having to remove any other parts other than the slip ring assembly. Of course, other wearable parts such as the brushes, which make contact with the surfaces of the slip ring assembly, may also be replaced during the rebuilding of the alternator.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A replacement slip ring assembly for an electric machine, having a rotor with a rotatable shaft being rotatable along a longitudinal axis, a field coil having a pair of coil leads, a fan having a central aperture through which the shaft passes, the pair of coil leads passing through a pair of openings in the fan, the replacement slip ring assembly comprising:

a pair of replacement slip rings longitudinally spaced from the fan, each replacement slip ring having a coupling terminal, said replacement slip rings being secured to said shaft, one of said coupling terminals being secured to one of the pair of coil leads of the coil, and the other one of the coupling terminals being secured to the other one of the pair of coil leads; and a pair of retaining members for securing the pair of coil leads and the coupling terminals to the fan, wherein said pair of retaining members are ultrasonically welded to said fan; and wherein said pair of replacement slip rings are secured to the electric machine after an original slip ring assembly is removed from the electric machine and said pair of retaining members provide a means for securing the pair of coil leads and the coupling terminals to the fan in substantially the same location as the pair of coil leads and the coupling terminals of the original slip ring assembly.

2. A rotor and replacement slip ring assembly having a shaft defining an axis of rotation of the rotor, first and second pole pieces affixed to the shaft for rotation therewith and together defining an interior cavity, a fan secured to either one of the pole pieces, a field-generating coil disposed within the interior cavity, the field-generating coil comprising a plurality of turns of electrical wire, the electrical wire further having a coil lead extending to and being electrically coupled to a lead of a replacement slip ring affixed to the shaft for rotation therewith, the coil lead and the lead of replacement slip ring defining a point of securement, the rotor and replacement slip ring assembly comprising:

a retaining member, said retaining member securing the point of securement to the fan, wherein said retaining member is ultrasonically welded to the fan; and wherein the replacement slip ring is secured to the rotor after an original slip ring is removed from the rotor, and said retaining member provides a means for securing the point of securement to the fan after the replacement slip ring is secured to the rotor.

3. The rotor and replacement slip ring assembly as in claim 2, wherein said retaining member secures the point of securement to a portion of the fan, the portion being the location of the securement of a lead of the original slip ring.

4. The rotor and replacement slip ring assembly as in claim 2, wherein the field-generating coil includes a pair of coil leads extending to and being electrically coupled to a pair of leads of a pair of replacement said slip rings to define a pair of points of securement, the pair of points of securement being secured to the fan by a pair of retaining members.

5. The replacement slip ring assembly as in claim 1, wherein said pair of retaining members each comprise: a receiving area being configured and dimensioned to cover the pair of coil leads and the pair of coupling terminals when said retaining members are secured to a surface of the fan.

6. The replacement slip ring assembly as in claim 5, wherein said pair of retaining members further comprise:

a pair of end portions depending outwardly from a pair of leg portions, said pair of leg portions being secured to each other at one end, and said pair of leg portions defining said receiving area, said end portions being secured to the surface of the fan.

7. The replacement slip ring assembly as in claim 6, wherein said pair of end portions each have a heat staking portion.

8. The replacement slip ring assembly as in claim 1, wherein said pair of retaining members secure the pair of coil leads and the coupling terminals to a portion of the fan, the portion comprising a portion of an original heat staking location of the original slip ring assembly.

9. A rotor and replacement slip ring assembly as in claim 2, wherein said retaining member defines a receiving area being configured and dimensioned to cover the point of securement when said retaining member is secured to a surface of the fan.

10. The rotor and replacement slip ring assembly as in claim 9, wherein said retaining member further comprises:

a pair of end portions depending outwardly from a pair of leg portions, said pair of leg portions being secured to each other at one end, and said pair of leg portions defining said receiving area, said end portions being secured to the surface of the fan.

11. The rotor and replacement slip ring assembly as in claim 10, wherein said pair of end portions each have a heat staking portion.

12. The rotor and replacement slip ring assembly as in claim 11, wherein said retaining member is constructed out of a polymer.

13. The rotor and replacement slip ring assembly as in claim 12, wherein the fan is constructed out of a polymer.

14. The rotor and replacement slip ring assembly as in claim 9, wherein said retaining member is manufactured by an injection molding process.

15. The rotor and replacement slip ring assembly as in claim 10, wherein said leg portions define a triangular receiving area.

16. The replacement slip ring assembly as in claim 1 wherein said pair of retaining members secure the pair of coil leads and the coupling terminals to a portion of the fan, the portion of the fan comprising a portion of an original hear staking location of an original point of securement of the pair of coils leads and a pair of original coupling terminals of a pair of original slip rings, wherein said replacement slip rings are replacements for the pair of original slip rings.

17. The rotor and replacement slip ring assembly as in claim 2, wherein said retaining member secures the point of securement to a portion of the fan, the portion of the fan comprising a portion of an original heat staking location of an original point of securement of the coil lead and an original lead of an original slip ring, wherein the replacement slip ring is a replacement for the original slip ring.

* * * * *